United States Patent Office 2,757,151
Patented July 31, 1956

2,757,151
PLASTICIZED POLYVINYL CHLORIDE POLYMER

Joachim Dazzi, Dayton, Ohio, assignor to Monsanto Chemical Company, St. Louis, Mo., a corporation of Delaware No Drawing. Application January 26, 1953, Serial No. 333,331

7 Claims. (Cl. 260—23)

This invention relates to compositions comprising polymers of vinyl halides and relates more particularly to compositions comprising vinyl chloride polymers plasticized with adducts of certain fumarates and certain unsaturated fatty oils.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition such as low volatility, color and heat stability, water absorption, etc.

Now I have found that good flexibility without sacrifice of temperature stability and low volatility is imparted to vinyl chloride polymers when there are employed as plasticizers adducts of certain alkyl fumarates and unsaturated, non-hydroxylated, non-conjugated fatty oils having from 10 to 24 carbon atoms in the acid portion of the molecules thereof. Such adducts may be characterized as polycarboxylates in which from 3 to 12 moles of a dialkyl fumarate of from 6 to 12 carbon atoms are combined at the acid portions of one mole of said fatty oil. The addition products which I have found to be particularly valuable as plasticizers for vinyl chloride polymers may be represented by the formula

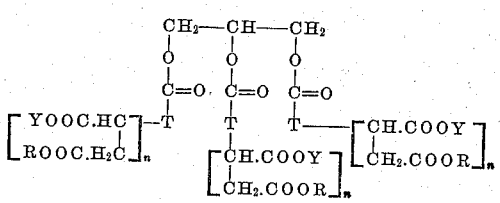

in which Y and R are alkyl radicals of from 1 to 4 carbon atoms, T is a non-conjugated, aliphatic olefinic hydrocarbon radical of from 9 to 23 carbon atoms, and $n$ is an integer of from 1 to 4.

Esters of fumaric acid which may be reacted with the non-conjugated, non-hydroxylated fatty oils to yield the presently useful adducts are simple or mixed dialkyl fumarates in which each alkyl radical has from 1 to 4 carbon atoms, e. g., methyl, ethyl, propyl, isopropyl, or $n$-butyl fumarate, ethyl methyl fumarate, isobutyl propyl fumarate, etc. As examples of useful fatty oils for the present purpose may be mentioned soy bean oil, safflower oil, olive oil, linseed oil, corn oil, peanut oil, perilla oil, salmon oil, menhaden oil, cotton seed oil, etc.

While isomeric mixtures are possible, and the position to which the fumarate residue is attached to the fatty acid portion of the triglyceride oils is not known, the reaction of, e. g., three moles of a dialkyl fumarate with one mole of an unsaturated, non-conjugated fatty oil such as olive oil may be illustrated by noting the probable reaction scheme with oleic acid triglyceride, the major component of olive oil:

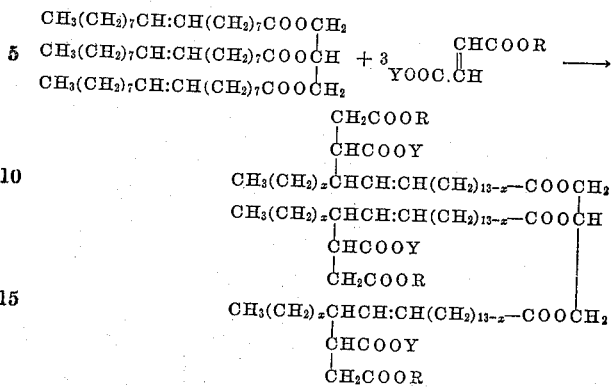

in which Y and R are as defined above, and $x$ is a whole number between 5 and 8.

Depending upon the reactant quantities and reaction conditions, from 1 to 4 fumarate residues can be added to each of the alkenyl portions of the triglyceride. Hence, as many as 27 carboxylate radicals may be present in the useful adducts.

The fatty oil-dialkyl fumarate adducts are particularly valuable as plasticizers for vinyl chloride polymers, in that they serve not only to soften vinyl chloride polymers, but also to impart low temperature flexibility, very good temperature stability, and great mechanical strength to these polymers. They are compatible with vinyl chloride polymers and show no exudation of plasticizer even at plasticizer content of up to 50 per cent. The plasticizing effect and compatibilty of the present adducts are remarkable, for the unmodified fatty oils are completely incompatible with vinyl chloride in any proportion. Although the useful quantities of the present plasticizers will depend upon the particular polymer to be plasticized and upon its molecular weight, it is generally found that compositions having from 5 to 50 per cent by weight of the present adducts will, in most cases, be satisfactory for general utility. The good flexibility of the plasticized compositions increases with increasing plasticizer concentration.

The present polycarboxylates are valuable plasticizers for polyvinyl chloride and copolymers of at least 70 per cent by weight of vinyl chloride and up to 30 per cent by weight of an unsaturated monomer copolymerizable therewith, for example, vinyl acetate, vinylidene chloride, etc.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument and Manufacturing Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. This value may also be defined as the lower temperature limit of the plasticized composition's usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for 24 hours is determined.

The present invention is further illustrated, but not limited, by the following examples:

Example 1

To a flask equipped with reflux condenser and mechanical stirrer there were charged 135 g. (0.15 mole) of soy bean oil and 151 g. (1.05 moles) of methyl fumarate. The mixture was refluxed in a nitrogen atmosphere for 10 hours at 200°–212° C. Distillation of the resulting reaction product at a pressure of 1–2 mm. of mercury and also in a nitrogen atmosphere to remove unreacted fumarate gave as residue 242 g. of an adduct in which one mole of soy bean oil had combined with an average of 5.0 moles of methyl fumarate.

Sixty parts of polyvinyl chloride and forty parts by weight of the above methyl fumarate-soy bean oil addition product were mixed on a rolling mill to a homogeneous blend. During the milling there was observed substantially no fuming and discoloration. A molded sheet of the mixture was clear, transparent, and substantially colorless. Testing of the molded sheet for low temperature flexibility, according to the testing procedure described above, gave a value of minus 3. Tests on the volatility characteristics of the plasticized composition gave a value of 1.10 per cent which showed excellent retention of plasticizer and indicated good temperature characteristics of the composition. The plasticized material had a water-absorption value of 0.55 per cent and a solids-loss value of 0.081 per cent. When subjected to heat at a temperature of 325° F. for a period of 30 minutes the clarity and color of the molded sheet were substantially unchanged.

Example 2

A mixture consisting of 0.15 mole (135 g.) of soy bean oil and 1.05 moles of ethyl fumarate was heated in a nitrogen atmosphere for 10 hours at 220–245° C. (mostly 220–235° C.). Distillation of the resulting reaction mixture at a pressure of 1–2 mm. of mercury and also in a nitrogen atmosphere, gave 42 g. of unreacted ethyl fumarate. The residue (285 g.) was the yellow highly viscous ethyl fumarate-soy bean oil. Based on reacted fumarate, one mole of the soy bean oil had combined with an average of 5.8 moles of the ethyl fumarate for formation of the adduct.

When subjected to the evaluation procedures of Example 1, polyvinyl chloride plasticized with the above soy bean oil-ethyl fumarate adduct was found to have a low temperature flexibility value of minus 3, a volatility value of 2.4 per cent, a water-absorption value of 0.55 per cent and a solids-loss of 0.08 per cent. The molded sheets were clear, homogeneous and substantially colorless, and when subjected to heat at 325° F. for 30 minutes the good properties thereof were substantially unchanged.

Example 3

A mixture consisting of 135 g. (0.15 mole) of safflower oil and 180.5 g. (1.05 moles) of ethyl fumarate was heated in a nitrogen atmosphere for about 4 hours at 230–267° C. Unreacted ethyl fumarate (40.2 g.) was then removed from the resulting reaction mixture by heating in vacuo (1–2 mm. Hg pressure) at an oil bath temperature of 210–230° C. There was obtained as residue 275 g. of viscous, light yellow adduct $n_D^{25}$ 1.4752, in which one mole of safflower oil had combined with an average of 5.04 moles of ethyl fumarate.

When subjected to the plasticizer evaluation procedures of Example 1, polyvinyl chloride which had been plasticized with the adduct of this example was found to have a low temperature flexibility value of minus 5° C., a volatility value of 1.67 per cent, a water-absorption value of 0.48 per cent and a solids-loss value of 0.028 per cent. The present molded sheets were homogeneous and of good, clear color. They were substantially unaffected by heating at 325° F. for 30 minutes.

Example 4

This example illustrates resistance of the present adducts to liquid hydrocarbons.

Sixty parts by weight of polyvinyl chloride and forty parts by weight of the soy bean oil-ethyl fumarate adduct (1:5.8 molar ratio adduct) of Example 2 were milled together to a homogeneous blend. Molded test specimens were prepared therefrom, said specimens being circles having a diameter of two inches and a thickness of 2 mm. The test specimens were immersed in kerosene for 24 hours at a temperature of 50° C., wiped dry, and then oven-dried at 50° C. for 44 hours. The dried specimens showed a weight change of plus 2.3 per cent as compared to the initial weight thereof.

This non-extractibility of the present adducts by kerosene from polyvinyl chloride resins plasticized by the same is remarkable in that commonly employed plasticizers are readily extracted when submitted to the same test. Thus, like-dimensioned molded test specimens of a milled blend consisting of 60 per cent polyvinyl chloride and 40 per cent dioctyl phthalate suffered a weight loss of 27.5 per cent when submitted to the same test.

While the above examples show only compositions in which the ratio of plasticizer to polymer content is 40:60, this ratio being employed in order to get comparable efficiencies, the content of adduct to polyvinyl chloride may be widely varied, depending upon the properties desired in the final product. For many purposes a plasticizer content of, say, from only 10 per cent to 20 per cent is preferred. The present polycarboxylates are compatible with polyvinyl chloride over wide ranges of concentrations, up to 50 per cent of esters based on the total weight of the plasticized composition yielding desirable products.

Although the invention has been described particularly with reference to the use of the present adducts as plasticizers for polyvinyl chloride, these polycarboxylates are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes, it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized compositions does not impair the valuable properties of the adducts. The present polycarboxylates are of general utility in softening vinyl chloride polymers. They may be used as the only plasticizing component in a compounded vinyl chloride polymer or they may be used in conjunction with other plasticizers.

What I claim is:

1. A resinous composition comprising a vinyl chloride polymer plasticized with an adduct in which one mole of an unsaturated, non-hydroxylated fatty oil having from 10 to 24 carbon atoms in the acid portion thereof is combined with from 3 to 12 moles of a dialkyl fumarate of from 6 to 12 carbon atoms.

2. A resinous composition comprising polyvinyl chloride plasticized with an adduct in which one mole of an unsaturated, non-hydroxylated fatty oil having from 10 to 24 carbon atoms in the acid portion thereof is combined with from 3 to 12 moles of a dialkyl fumarate of from 6 to 12 carbon atoms.

3. A resinous composition comprising a copolymer of at least 70 per cent by weight of vinyl chloride and up to 30 per cent by weight of an unsaturated monomer copolymerized therewith, said copolymer being plasticized with an adduct in which one mole of an unsaturated, non-hydroxylated fatty oil having from 10 to 24 carbon atoms in the acid portion thereof is combined with from 3 to 12 moles of a dialkyl fumarate of from 6 to 12 carbon atoms.

4. A resinous composition comprising polyvinyl chloride plasticized with an adduct in which one mole of soy bean oil is combined with from 3 to 12 moles of a dialkyl fumarate of from 6 to 12 carbon atoms.

5. A resinous composition comprising polyvinyl chloride plasticized with an adduct in which one mole of soy bean oil is combined with from 3 to 12 moles of methyl fumarate.

6. A resinous composition comprising polyvinyl chloride plasticized with an adduct in which one mole of soy bean oil is combined with from 3 to 12 moles of ethyl fumarate.

7. A resinous composition comprising polyvinyl chloride plasticized with an adduct in which one mole of safflower oil is combined with from 3 to 12 moles of ethyl fumarate.

References Cited in the file of this patent

UNITED STATES PATENTS

| | | |
|---|---|---|
| 2,188,884 | Clocker | Jan. 30, 1940 |
| 2,188,888 | Clocker | Jan. 30, 1940 |
| 2,630,418 | Dazzi | Mar. 3, 1953 |
| 2,630,441 | Dazzi | Mar. 3, 1953 |
| 2,678,934 | Grummitt | May 18, 1954 |
| 2,687,421 | Butler | Aug. 24, 1954 |